United States Patent
Lyu et al.

(10) Patent No.: US 12,300,012 B2
(45) Date of Patent: May 13, 2025

(54) METHOD AND DEVICE FOR TRAINING, BASED ON CROSSMODAL INFORMATION, DOCUMENT READING COMPREHENSION MODEL

(71) Applicant: BEIJING BAIDU NETCOM SCIENCE TECHNOLOGY CO., LTD., Beijing (CN)

(72) Inventors: Shangwen Lyu, Beijing (CN); Hongyu Li, Beijing (CN); Jing Liu, Beijing (CN); Hua Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 343 days.

(21) Appl. No.: 17/984,034

(22) Filed: Nov. 9, 2022

(65) Prior Publication Data
US 2023/0061398 A1   Mar. 2, 2023

(30) Foreign Application Priority Data
Dec. 27, 2021   (CN) .......................... 202111618355.3

(51) Int. Cl.
*G06V 30/19*     (2022.01)
*G06F 40/205*    (2020.01)
(Continued)

(52) U.S. Cl.
CPC ........ *G06V 30/1918* (2022.01); *G06F 40/205* (2020.01); *G06V 30/194* (2022.01); *G06V 30/412* (2022.01)

(58) Field of Classification Search
CPC .... G06V 30/10; G06V 30/194; G06V 30/412; G06V 30/414; G06V 30/416; G06V 30/1918; G06F 40/205
See application file for complete search history.

(56) References Cited

U.S. PATENT DOCUMENTS

| | | | |
|---|---|---|---|
| 11,321,329 B1 * | 5/2022 | Shih | ................. G06F 16/2272 |
| 2020/0320411 A1 * | 10/2020 | Hebenthal | ................. G06N 5/04 |
| 2021/0326524 A1 | 10/2021 | Zeng et al. | |

FOREIGN PATENT DOCUMENTS

| | | |
|---|---|---|
| CN | 110750630 A | 2/2020 |
| CN | 111444677 A | 7/2020 |

(Continued)

OTHER PUBLICATIONS

Mao (Computer English Translation of Chinese Patent No. CN 112417885 A) (Year: 2021).*

(Continued)

*Primary Examiner* — Daniel G Mariam
(74) *Attorney, Agent, or Firm* — Lippes Mathias LLP

(57) ABSTRACT

A method for training a document reading comprehension model includes: acquiring a question sample and a rich-text document sample, in which the rich-text document sample includes a real answer of the question sample; acquiring text information and layout information of the rich-text document sample by performing OCR processing on image information of the rich-text document sample; acquiring a predicted answer of the question sample by inputting the text (Continued)

information, the layout information and the image information of the rich-text document sample into a preset reading comprehension model; and training the reading comprehension model based on the real answer and the predicted answer. The method may enhance comprehension ability of the reading comprehension model to the long rich-text document, and save labor cost.

16 Claims, 7 Drawing Sheets

(51) Int. Cl.
*G06V 30/194* (2022.01)
*G06V 30/412* (2022.01)

(56) References Cited

FOREIGN PATENT DOCUMENTS

| | | | |
|---|---|---|---|
| CN | 112527999 | A | 3/2021 |
| CN | 113204611 | A | 8/2021 |
| CN | 113360699 | A | 9/2021 |
| EP | 3709207 | A1 | 9/2020 |
| EP | 3816818 | A2 | 5/2021 |
| JP | 2014120053 | A | 6/2014 |
| WO | 2021171732 | A1 | 9/2021 |

OTHER PUBLICATIONS

Mishra, Anand et al.; OCR-VQA: Visual Question and Answering by Reading Text in Images, Sep. 20, 2019 International Conference on Document Analysis and Recognition (ICDAR); 6 pages.

European Search Report for Application No. 22205704.4 dated Feb. 14, 2023.

Tanaka, Ryota et al.; "VisualMRC: Machine Reading Comprehension on Document Images", NTT Media Intelligence Laboratories, NTT Corporation; May 10, 2021; 11 pages.

Office Action for Japanese Patent Application No. 2022-176330, dated Jan. 9, 2024, 22 pages.

Office Action for Chinese Application No. 202111618355.3, dated Aug. 8, 2022, 23 pages.

Office Action for Chinese Application No. 202111618355.3, dated Nov. 3, 2022, 7 pages.

Yiheng Xu et al., "LayoutXLM: Multimodal Pre-training for Multilingual Visually-rich Document Understanding", Sep. 9, 2021, 10 pages.

\* cited by examiner

METHOD AND DEVICE FOR TRAINING, BASED ON CROSSMODAL INFORMATION, DOCUMENT READING COMPREHENSION MODEL

CROSS-REFERENCE TO RELATED APPLICATION

This application is based upon and claims priority to Chinese Patent Application No. 202111618355.3, filed on Dec. 27, 2021, the entire content of which is incorporated herein by reference.

TECHNICAL FIELD

The disclosure relates to the field of data processing, specifically to natural language processing (NLP) and deep learning (DL) technologies, and particularly to, a method for training, based on cross-modal information, a document reading comprehension model, a method for visual question-answering of a document, an electronic device, and a storage medium.

BACKGROUND

In the related art, information extraction needs to be performed on text of a document based on pure-text reading comprehension technologies, to acquire text information from the document. However, different extraction solutions need to be designed for documents from different sources, which consume time and labor.

SUMMARY

According to a first aspect of the disclosure, a method for training, based on cross-modal information, a document reading comprehension model, is provided, and includes: acquiring a question sample and a rich-text document sample, in which the rich-text document sample includes a real answer of the question sample; acquiring text information and layout information of the rich-text document sample by performing optical character recognition (OCR) processing on image information of the rich-text document sample; acquiring a predicted answer of the question sample by inputting the text information, the layout information and the image information of the rich-text document sample into a preset reading comprehension model; and training the reading comprehension model based on the real answer and the predicted answer.

According to a second aspect of the disclosure, a method for visual question-answering of a document is provided, and includes: acquiring a candidate rich-text document corresponding to question information in response to receiving the question information; acquiring text information and layout information of the candidate rich-text document by performing OCR processing on image information of the candidate rich-text document; acquiring text segments by segmenting the candidate rich-text document based on a preset step length, and acquiring spliced text segments by splicing the question sample with the text segments respectively; and generating answer information corresponding to the question information based on the spliced text segments, the layout information and the image information.

According to a third aspect of the disclosure, an electronic device is provided, and includes: a processor; and a memory for storing instructions executable by the processor; in which the processor is configured to perform the method as described in the first aspect or the second aspect.

According to a fourth aspect of the disclosure, a non-transitory computer readable storage medium stored with computer instructions is provided. The computer instructions are configured to cause a computer to perform the method as described in the first aspect or the second aspect.

It should be understood that, the content described in the part is not intended to recognized as key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solutions, and do not constitute a limitation to the disclosure.

DETAILED DESCRIPTION

Embodiments of the disclosure are described as below with reference to the accompanying drawings, which include various details of embodiments of the disclosure to facilitate understanding, and should be considered as merely exemplary. Therefore, those skilled in the art should realize that various changes and modifications may be made to the embodiments described herein without departing from the scope and spirit of the disclosure. Similarly, for clarity and conciseness, descriptions of well-known functions and structures are omitted in the following descriptions.

Figure 1:
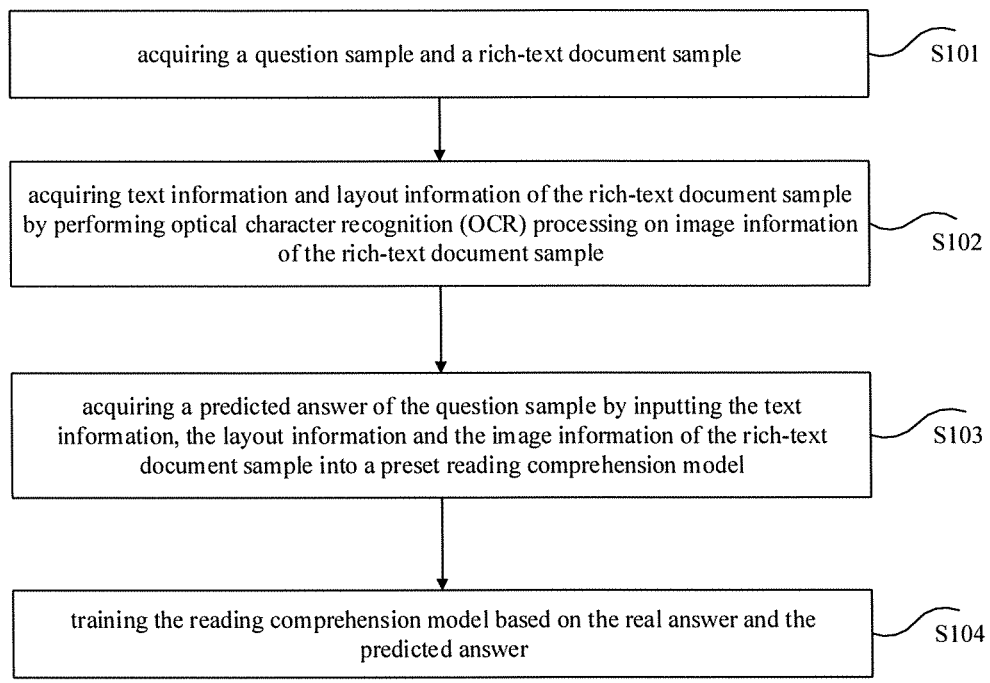
FIG. 1 is a diagram according to a first embodiment of the disclosure.

FIG. 1 is a flowchart illustrating a method for training a document reading comprehension model based on cross-modal information according to some embodiments of the disclosure. The method may be applicable to training a reading comprehension model required in an answer-questioning application. As illustrated in FIG. 1, the method may include the following.

At S101, a question sample and a rich-text document sample are acquired.

The long rich-text document sample includes a real answer of the question sample. The long rich-text document sample refers to a document with much character information and including a plurality of formats (for example, font colors, pictures and tables). The resource of the long rich-text document sample includes but is not limited to a web page, a PDF (Portable Document Format) and a scanned copy of a paper document, etc.

For example, a question may be taken as the question sample and the long rich-text document corresponding to the question may be acquired as the long rich-text document sample, in response to the question proposed by a user using an answer-questioning application, in which the long rich-text document sample has answer content of the question.

At S102, text information and layout information of the rich-text document sample is acquired by performing OCR processing on image information of the rich-text document sample.

For example, the apparatus for acquiring images may acquire image data of the long rich-text document sample and perform OCR on the image data to acquire the text information and layout information of the long rich-text document sample. For example, the long rich-text document sample may be regarded as a document image, and the document image may be parsed using an OCR technology, to acquire the text information and layout information.

At S103, a predicted answer of the question sample is acquired by inputting the text information, the layout information and the image information of the rich-text document sample into a preset reading comprehension model.

For example, the text information, the layout information and the image information of the rich-text document sample is taken as input data, the input data is input into the preset reading comprehension model and the output of the reading comprehension model is taken as the predicted answer of the question sample.

At S104, the reading comprehension model is trained based on the real answer and the predicted answer.

For example, related parameters of the reading comprehension model may be adjusted based on the difference between the real answer and the predicted answer, to reduce a deviation between the real answer and the predicted answer and train the reading comprehension model.

By implementing embodiments of the disclosure, modeling using cross-modal information (text, layout, and vision) may improve the comprehension ability to the document; modeling using the rich-text document sample may enhance the comprehension ability of the reading comprehension model to the rich-text document; in addition, information extraction is replaced using the OCR recognition technology, without necessarily designing respectively specific information extraction solutions for documents from different sources, so that the complete process is more end to end, which saves the labor cost.

Figure 2:
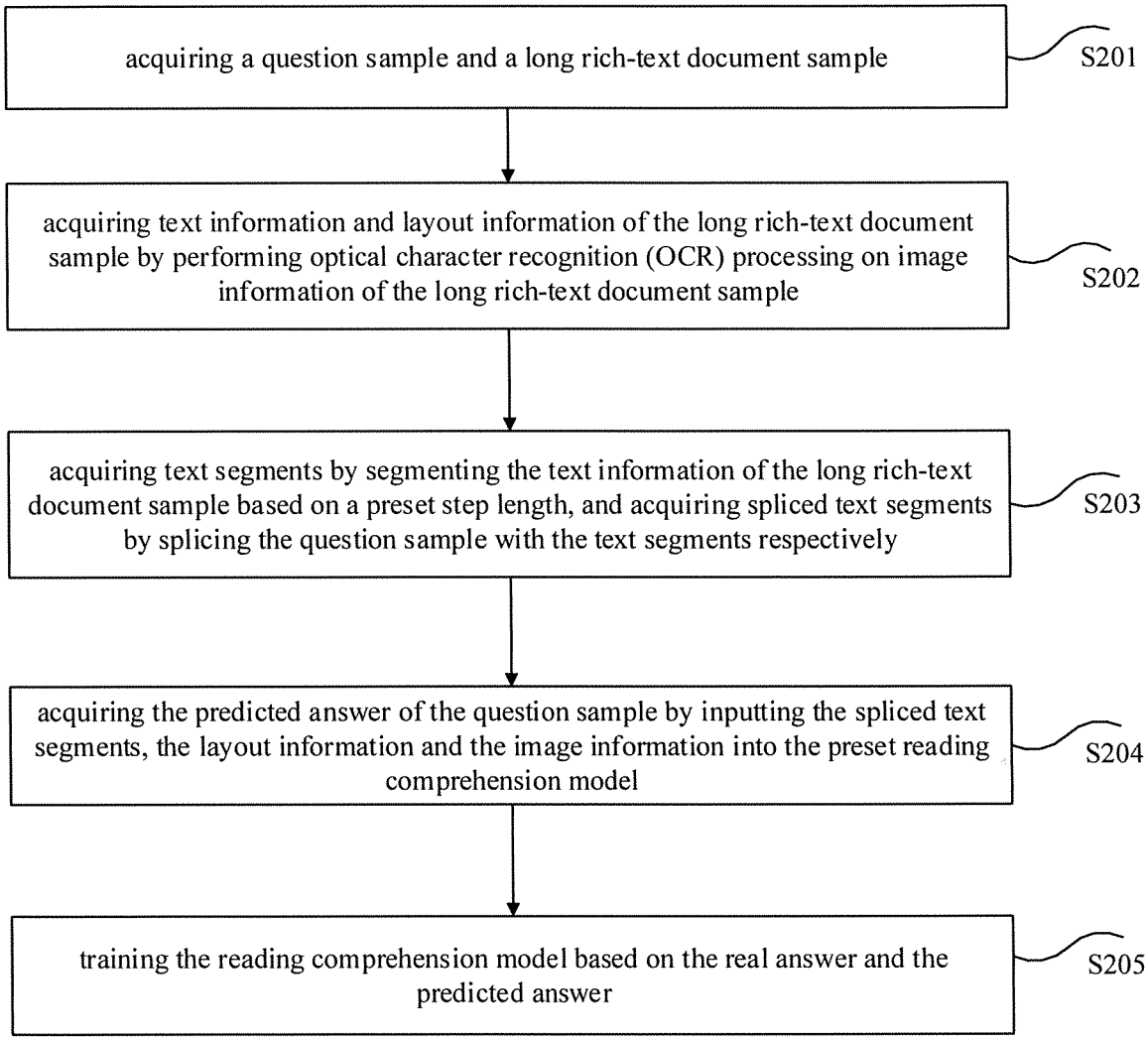
FIG. 2 is a diagram according to a second embodiment of the disclosure.

FIG. 2 is a diagram illustrating a method for training a document reading comprehension model based on cross-modal information according to a second embodiment of the disclosure. In some embodiments of the disclosure, the rich-text document sample is a long rich-text document sample, and the long rich-text document sample may be split and processed. The method may include the following.

At S201, a question sample and a long rich-text document sample are acquired.

The long rich-text document sample includes a real answer of the question sample.

In some embodiments of the disclosure, S201 may be achieved by any of embodiments in the disclosure, which will not be limited nor repeated herein.

At S202, text information and layout information of the long rich-text document sample is acquired by performing OCR processing on image information of the long rich-text document sample.

In some embodiments of the disclosure, S202 may be achieved by any of embodiments in the disclosure, which will not be limited nor repeated herein.

At S203, text segments are acquired by segmenting the text information of the long rich-text document sample based on a preset step length, and spliced text segments are acquired by splicing the question sample with the text segments respectively.

For example, the text information of the long rich-text document sample acquired is segmented into a plurality of segments in sequence, and each segment includes a preset same character number. Taking the preset step length is 512 for an example, the long rich-text document sample acquired may be segmented into the plurality of text segments based on the step length of 512. Spliced text segments are acquired by splicing each segment with the question sample.

At S204, a predicted answer of the question sample is acquired by inputting the spliced text segments, the layout information and the image information into a preset reading comprehension model.

For example, the spliced text segments, the layout information and the image information are taken as input data and input into the preset reading comprehension model, and the output of the reading comprehension model is taken as the predicted answer of the question sample.

At S205, the reading comprehension model is trained based on the real answer and the predicted answer.

In some embodiments of the disclosure, S205 may be achieved by any of embodiments in the disclosure, which will not be limited nor repeated herein.

By implementing embodiments of the disclosure, the long rich-text document may be segmented, and the document acquired by segmenting may be modeled, which may enhance the comprehension ability of the reading comprehension model to the long rich-text document.

Figure 3:
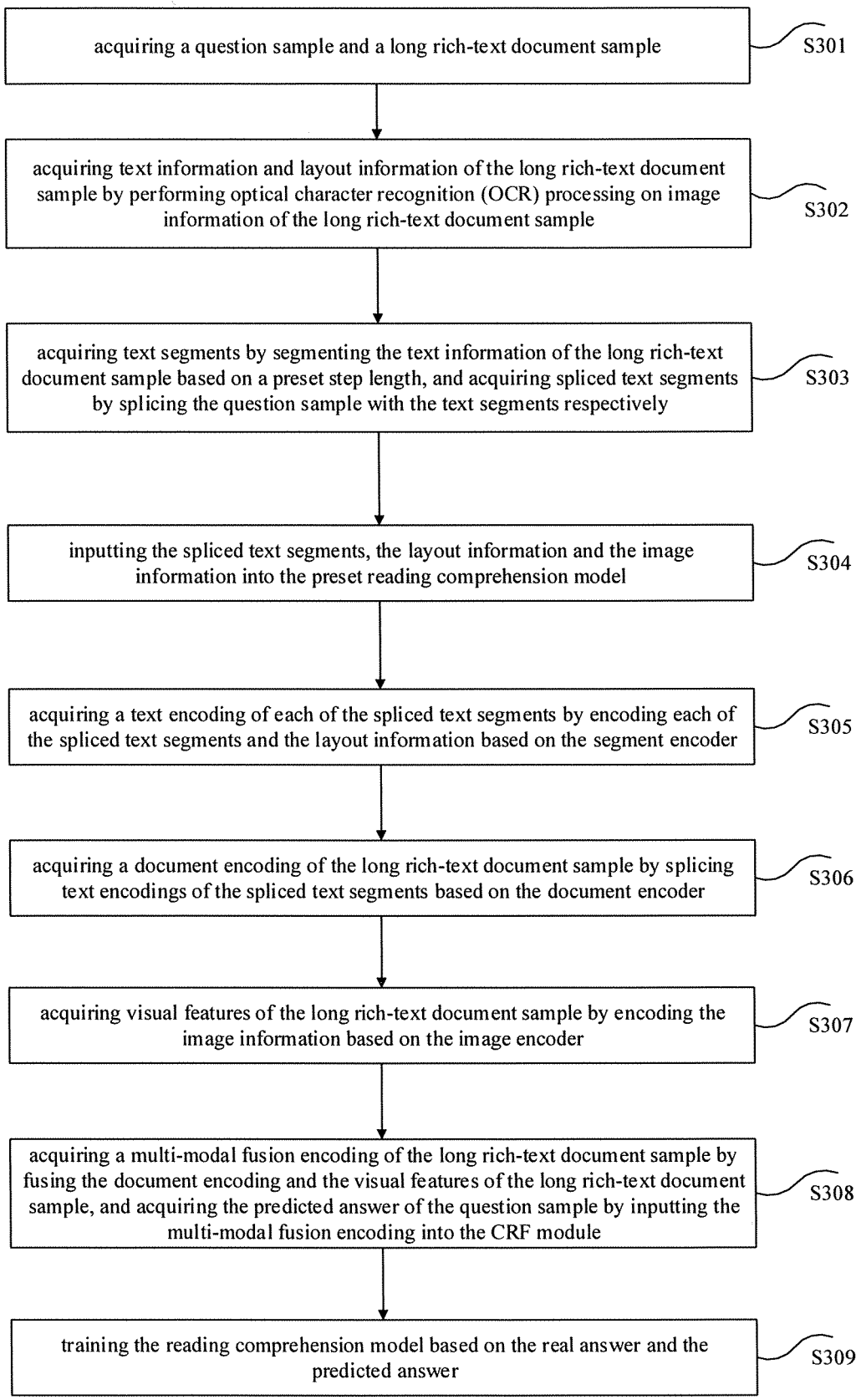
FIG. 3 is a diagram according to a third embodiment of the disclosure.

FIG. 3 is a diagram illustrating a method for training a document reading comprehension model based on cross-modal information according to a third embodiment of the disclosure. In some embodiments of the disclosure, the reading comprehension model includes a segment encoder, a document encoder, an image encoder and a conditional random field (CRF) module. As illustrated in FIG. 3, the method may include the following.

At S301, a question sample and a long rich-text document sample are acquired.

In some embodiments of the disclosure, S301 may be achieved by any of embodiments in the disclosure, which will not be limited nor repeated herein.

At S302, text information and layout information of the long rich-text document sample is acquired by performing OCR processing on image information of the long rich-text document sample.

In some embodiments of the disclosure, S302 may be achieved by any of embodiments in the disclosure, which will not be limited nor repeated herein.

At S303, text segments are acquired by segmenting the text information of the long rich-text document sample based on a preset step length, and spliced text segments are acquired by splicing the question sample with the text segments respectively.

In some embodiments of the disclosure, S303 may be achieved by any of embodiments in the disclosure, which will not be limited nor repeated herein.

At S304, the spliced text segments, the layout information and the image information are input into a preset reading comprehension model.

In some embodiments of the disclosure, S304 may be achieved by any of embodiments in the disclosure, which will not be limited nor repeated herein.

At S305, a text encoding of each of the spliced text segments is acquired by encoding each of the spliced text segments and the layout information based on the segment encoder.

For example, the text encoding of each spliced text segment may be generated by integrating and encoding each spliced text segment with the layout information corresponding to the spliced text segment.

At S306, a document encoding of the long rich-text document sample is acquired by splicing text encodings of the spliced text segments based on the document encoder.

For example, the document encoding of the long rich-text document sample may be acquired by splicing the text encodings of the spliced text segments based on the document encoder.

At S307, visual features of the long rich-text document sample are acquired by encoding the image information based on the image encoder.

In some embodiments of the disclosure, visual features of the document sample refer to appearance features of some parts in the document that differ from other parts in the document, including but not limited to: font bold, font color change, underline.

For example, the image information may be transformed and combined into digitized information data capable of being processed by a computer through the image encoder based on a preset rule, thereby acquiring the visual features of the long rich-text document sample.

At S308, a multi-modal fusion encoding of the long rich-text document sample is acquired by fusing the document encoding and the visual features of the long rich-text document sample, and the predicted answer of the question sample is acquired by inputting the multi-modal fusion encoding into the CRF module.

For example, the multi-modal fusion encoding of the long rich-text document sample is acquired by processing the document encoding and the visual features of the long rich-text document sample using a preset feature fusion algorithm model, and the multi-modal fusion encoding is taken as input data and input into the CRF module, and the output data of the CRF module is taken as the predicted answer of the question sample.

As an example, the feature fusion algorithm model may be may be a Transformer model, and the specific way of the multi-modal fusion may include but not limited to: linearly fusing feature vectors of the document encoding and the visual features; calculating a similarity matrix of the document encoding and visual features and fusing based on the similarity; or directly splicing feature vectors of the document encoding and visual features.

For example, attribution of sub-segments is completed by performing sequence labeling on the multi-modal fusion encoding, answer sub-segments belonging to the same attribute are screened to remove the part not belonging to the answer segments and integrate other parts not within the answer subsegment to transform the discontinuous answer segments into continuous segments, thereby acquiring the answer information corresponding to the question information.

At S309, the reading comprehension model is trained based on the real answer and the predicted answer.

In some embodiments of the disclosure, S309 may be achieved by any of embodiments in the disclosure, which will not be limited nor repeated herein.

By implementing embodiments of the disclosure, the multi-modal fusion encoding may be acquired by processing based on the question sample and the long rich-text document sample, and extraction of document information may be completed based on the multi-modal fusion encoding, which enhances the comprehension ability to the document, and specific information extraction solutions for documents from different sources are not necessarily designed, which saves the labor cost.

In some embodiments of the disclosure, the reading comprehension model further includes a classifier; the method for training a document reading comprehension model based on cross-modal information further includes: acquiring a spliced encoding by splicing the multi-modal fusion encoding and an encoding of the question sample; and acquiring a similarity predicted value between the question sample and the long rich-text document sample by inputting the spliced encoding into the classifier.

Optionally, training the reading comprehension model based on the real answer and the predicted answer, includes: generating a first loss value based on the real answer and the predicted answer; generating a second loss value based on the similarity predicted value and a similarity real value between the question sample and the long rich-text document sample; and training the reading comprehension model based on the first loss value and the second loss value.

For example, the first loss value is generated based on a preset first loss function based on the similarity real value between the real answer and the predicted answer; the second loss value is generated by bringing into a preset second loss function based on the similarity predicted value and the similarity real value between the question sample and the long rich-text document sample; and related parameters of the reading model are adjusted based on the first loss function and the second loss function, to reduce the loss value, and train the reading comprehension model.

By implementing embodiments of the disclosure, the reading comprehension model may be trained based on the loss value, to improve the accuracy of answer information generated by the reading comprehension model.

In an alternative implementation, acquiring the answer information corresponding to the question information by inputting the multi-modal fusion encoding into the CRF module, includes: inputting the multi-modal fusion encoding into the CRF module; acquiring an answer sequence labeling output by the CRF module, in which the answer sequence labeling includes an answer begin labeling, an answer inside labeling, an answer outside labeling, an answer end labeling, and a single-character answer labeling; and extracting the answer information corresponding to the question information from the candidate rich-text document based on the answer sequence labeling.

The answer sequence labeling is acquired from the labeling answer sequence of the long rich-text document sample by a CRF module based on a sequence labeling way of B(Begin), I(Inside), O(outside), E(End) and S(Single); and the answer sequence labeling includes an answer begin labeling (B), an answer inside labeling (I), an answer outside labeling (O), an answer end labeling (E), and a single-character answer labeling (S).

It needs to be noted that, since the answer segment may be discontinuous, the answer segment may include a plurality of answer subsegments, and the answer subsegments need to be labeled for convenience of subsequent processing. The answer begin labeling is configured to label a beginning character position of one answer subsegment in the labeling answer sequence; the non-answer text labeling within an answer segment is configured to label a character not belonging to answer information within the answer subsegment; the answer outside labeling is configured to label the character associated with answer information not within any answer subsegment; the answer end labeling is configured to label a character at an end position of one answer subsegment in the labeling answer sequence; and the single-character answer labeling is configured to label a character representing one single answer information entity.

Optionally, the answer sequence labeling further includes a non-answer text labeling within an answer segment.

It needs to be noted that, the non-answer text labeling within an answer segment is configured to label other noise information not belonging to answer information within one answer subsegment to process the interrupted answer.

For example, interruption of the same answer text caused by discontinuous answer information due to a label or a page layout may be labeled.

Figure 4:
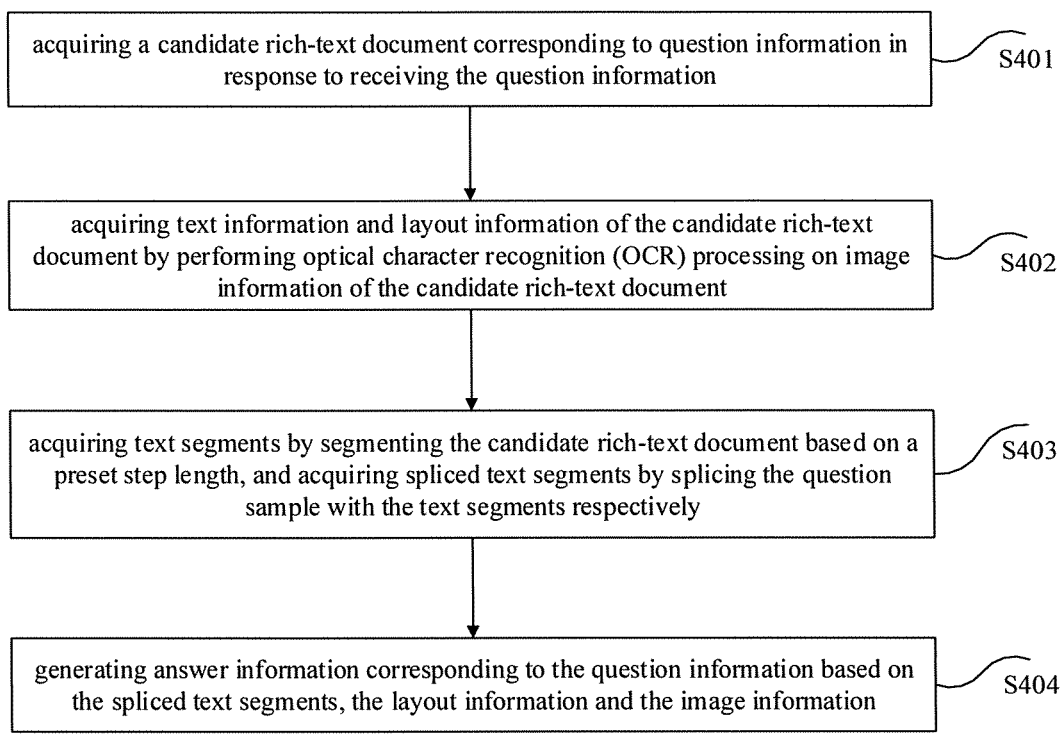
FIG. 4 is a diagram according to a fourth embodiment of the disclosure.

FIG. 4 is a flowchart illustrating a method for visual question-answering of a document according to a third embodiment of the disclosure. As illustrated in FIG. 4, the method may include the following.

At S410, a candidate rich-text document corresponding to question information is acquired in response to receiving the question information.

For example, a rich-text document including related information of the question information may be acquired as the candidate rich-text document in response to the question information proposed by the user in the answer-questioning application.

At S102, text information and layout information of the candidate rich-text document is acquired by performing OCR processing on image information of the candidate rich-text document.

In some embodiments of the disclosure, S402 may be achieved by any of embodiments in the disclosure, which will not be limited nor repeated herein.

At S403, text segments are acquired by segmenting the candidate rich-text document based on a preset step length, and spliced text segments are acquired by splicing the question sample with the text segments respectively.

In some embodiments of the disclosure, S403 may be achieved by any of embodiments in the disclosure, which will not be limited nor repeated herein.

At S404, answer information corresponding to the question information is generated based on the spliced text segments, the layout information and the image information.

In one implementation, generating the answer information corresponding to the question information based on the spliced text segments, the layout information and the image information, includes: acquiring the answer information corresponding to the question information by inputting the spliced text segments, the layout information and the image information into a pre-established reading comprehension model.

In some embodiments of the disclosure, the reading comprehension model may be acquired by any of embodiments in the disclosure, which will not be limited nor repeated herein.

For example, the spliced text segments, the layout information and the image information are taken as input data and input into the pre-established reading comprehension model, and the output data of the model is taken as the answer information corresponding to the question information.

In an alternative implementation, the reading comprehension model includes a segment encoder, a document encoder, an image encoder and a CRF module; acquiring the answer information corresponding to the question information by inputting the spliced text segments, the layout information and the image information into the pre-established reading comprehension model, includes: inputting the spliced text segments, the layout information and the image information into the reading comprehension model; acquiring a text encoding of each of the spliced text segments by encoding each of the spliced text segments and the layout information based on the segment encoder; acquiring a document encoding of the candidate rich-text document by splicing text encodings of the spliced text segments based on the document encoder; acquiring visual features of the candidate rich-text document by encoding the image information based on the image encoder; and acquiring a multi-modal fusion encoding of the candidate rich-text document by fusing the document encoding and the visual features of the candidate rich-text document, and acquiring the answer information corresponding to the question information by inputting the multi-modal fusion encoding into the CRF module.

In some embodiments of the disclosure, the reading comprehension model further includes a classifier; the method further includes: acquiring a spliced encoding by splicing the multi-modal fusion encoding and an encoding of the question sample; and acquiring a similarity predicted value between the question information and the candidate rich-text document by inputting the spliced encoding into the classifier.

Optionally, the answer information is output in response to the similarity predicted value being greater than or equal to a threshold.

For example, the generated answer information is output as the answer information for answer-questioning of the document in response to the similarity predicted value between the question information and the candidate rich-text document being greater than or equal to a preset similarity threshold.

Optionally, outputting the answer information, includes: determining coordinate information of each text in the answer information based on the layout information; and highlighting the answer information in the candidate rich-text document based on the coordinate information.

For example, the specific coordinate of each text in the answer information in the candidate rich-text document is determined based on the coordinate information, and the text corresponding to the answer information in the candidate rich-text document is highlighted based on the coordinate information, and highlighted answer text is directly skipped to when a user opens the candidate rich-text document.

Optionally, the answer information is omitted in response to the similarity predicted value being less than a threshold.

For example, the generated answer information is omitted in response to the similarity predicted value between the question information and the candidate rich-text document being less than the preset similarity threshold.

By implementing embodiments of the disclosure, when the answer information is generated, it may be determined whether to provide the answer generated to the user based on the similarity, to compress the document sample not including the answer information, which enhances the accuracy of generating the answer.

Optionally, acquiring the answer information corresponding to the question information by inputting the multi-modal fusion encoding into the CRF module, includes: inputting the multi-modal fusion encoding into the CRF module; acquiring an answer sequence labeling output by the CRF module, in which the answer sequence labeling includes an answer begin labeling, an answer inside labeling, an answer outside labeling, an answer end labeling, and a single-character answer labeling; and extracting the answer information corresponding to the question information from the candidate rich-text document based on the answer sequence labeling.

Optionally, the answer sequence labeling further includes a non-answer text labeling within an answer segment.

In some embodiments of the disclosure, the above actions may be achieved by any of embodiments in the disclosure, which will not be limited nor repeated herein.

By implementing embodiments of the disclosure, the candidate rich-text document may be modeled, and more accurate comprehension question-answering of the document based on cross-modal information (text, layout, and vision) is achieved through the pre-trained reading comprehension model. In addition, information extraction is replaced using the OCR recognition technology, without necessarily designing respectively specific information extraction solutions for documents from different sources, so that the complete process is more end to end, which saves the labor cost.

Figure 5:
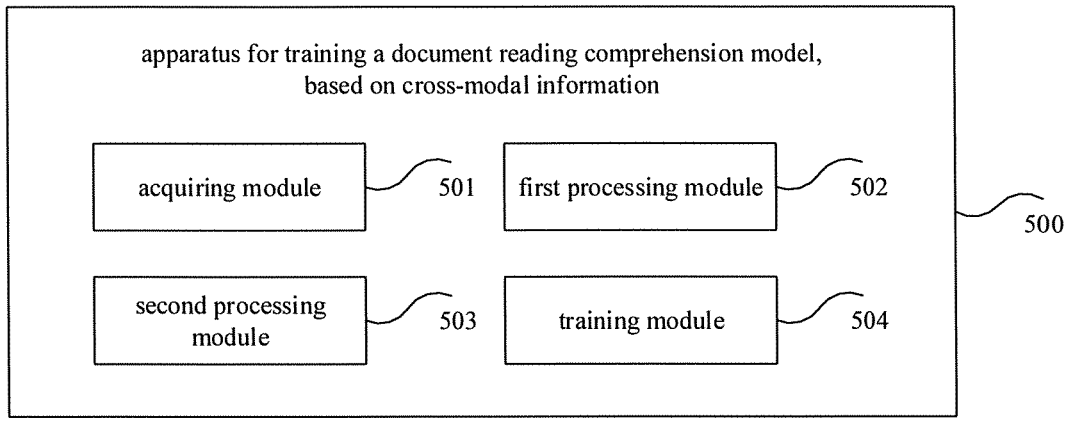
FIG. 5 is a diagram illustrating an apparatus for training a document reading comprehension model based on cross-modal information according to some embodiments of the disclosure.

FIG. 5 is a diagram illustrating an apparatus for training a document reading comprehension model based on cross-modal information according to some embodiments of the disclosure. The apparatus includes an acquiring module 501, a first processing module 502, a second processing module 503 and a training module 504.

The acquiring module 501 is configured to acquire a question sample and a rich-text document sample; in which the rich-text document sample includes a real answer of the question sample; the first processing module 502 is configured to acquire text information and layout information of the rich-text document sample by performing OCR processing on image information of the rich-text document sample; the second processing module 503 is configured to acquire a predicted answer of the question sample by inputting the text information, the layout information and the image information of the rich-text document sample into a preset reading comprehension model; and the training module 504 is configured to train the reading comprehension model based on the real answer and the predicted answer.

In an implementation, the rich-text document sample is a long rich-text document sample; the second processing module 503 is configured to: acquire text segments by segmenting the text information of the long rich-text document sample based on a preset step length, and acquire spliced text segments by splicing the question sample with the text segments respectively; and acquire the predicted answer of the question sample by inputting the spliced text segments, the layout information and the image information into a preset reading comprehension model.

In an implementation, the reading comprehension model includes a segment encoder, a document encoder, an image encoder and a CRF module; the second processing module 503 is configured to: input the spliced text segments, the layout information and the image information into the preset reading comprehension model; acquire a text encoding of each of the spliced text segments by encoding each of the spliced text segments and the layout information based on the segment encoder; acquire a document encoding of the long rich-text document sample by splicing text encodings of the spliced text segments based on the document encoder; acquire visual features of the long rich-text document sample by encoding the image information based on the image encoder; and acquire a multi-modal fusion encoding of the long rich-text document sample by fusing the document encoding and the visual features of the long rich-text document sample, and acquire the predicted answer of the question sample by inputting the multi-modal fusion encoding into the CRF module.

Figure 6:
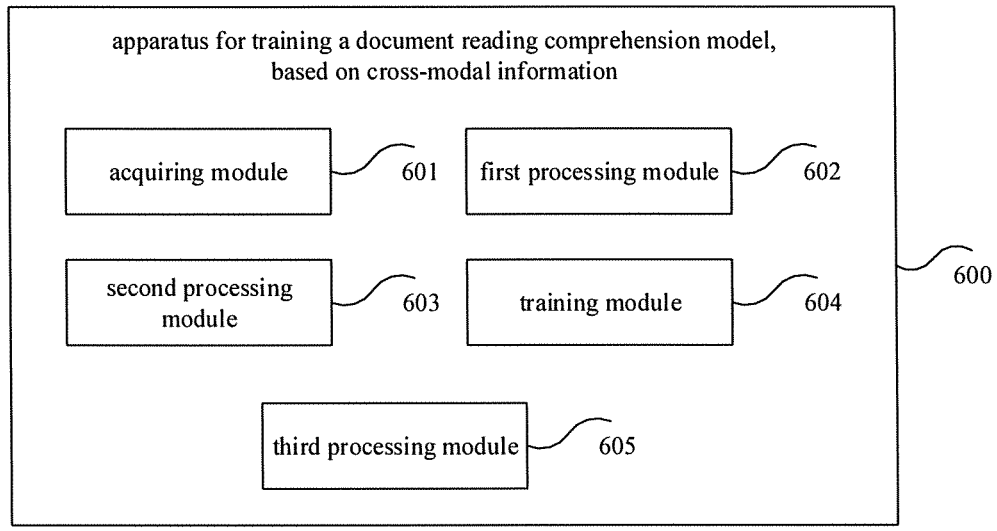
FIG. 6 is a diagram illustrating another apparatus for training a document reading comprehension model based on cross-modal information according to some embodiments of the disclosure.

In an alternative implementation, the reading comprehension model further includes a classifier; the apparatus further includes: a third processing module. As an example, as illustrated in FIG. 6, the apparatus further includes a third processing module 605 configured to acquire a spliced encoding by splicing the multi-modal fusion encoding and an encoding of the question sample; and acquire a similarity predicted value between the question sample and the long rich-text document sample by inputting the spliced encoding into the classifier. Blocks 601 to 604 in FIG. 6 have the same function and structure with blocks 501 to 504 in FIG. 5.

Optionally, the training module 504 is configured to: generate a first loss value based on the real answer and the predicted answer; generate a second loss value based on the similarity predicted value and a similarity real value between the question sample and the long rich-text document sample; and train the reading comprehension model based on the first loss value and the second loss value.

In an alternative implementation, the second processing module 503 is configured to: input the multi-modal fusion encoding into the CRF module; acquire an answer sequence labeling output by the CRF module; in which, the answer sequence labeling includes an answer begin labeling, an answer inside labeling, an answer outside labeling, an answer end labeling, and a single-character answer labeling; and extract the predicted answer of the question sample from the long rich-text document sample based on the answer sequence labeling.

Optionally, the answer sequence labeling further includes a non-answer text labeling within an answer segment.

Figure 7:
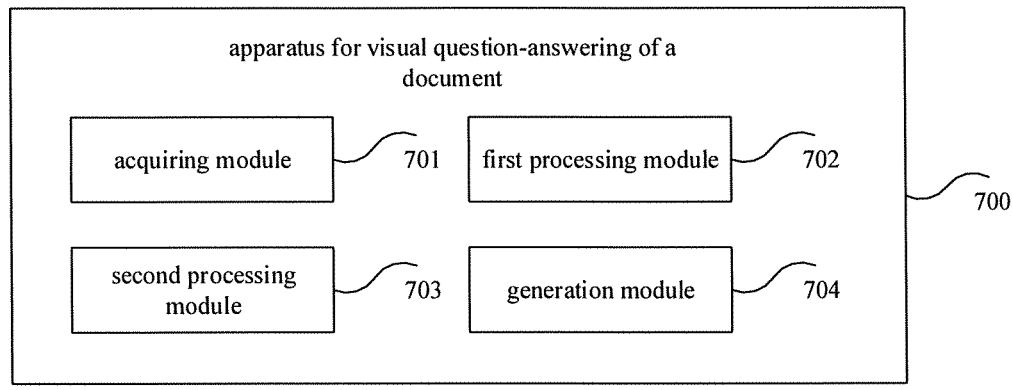
FIG. 7 is a diagram illustrating an apparatus for visual question-answering of a document according to some embodiments of the disclosure.

FIG. 7 is a diagram illustrating an apparatus for visual question-answering of a document according to some embodiments of the disclosure. The apparatus includes an acquiring module 701, a first processing module 702, a second processing module 703 and a generation module 704. The acquiring module 701 is configured to acquire a candidate rich-text document corresponding to question information in response to receiving the question information; the first processing module 702 is configured to acquire text information and layout information of the candidate rich-text document by performing OCR processing on image information of the candidate rich-text document; the second processing module 703 is configured to acquire text segments by segmenting the candidate rich-text document based on a preset step length, and acquiring spliced text segments by splicing the question sample with the text segments respectively; and the generation module 704 is configured to generate answer information corresponding to the question information based on the spliced text segments, the layout information and the image information.

In an implementation, the generation module 704 is configured to: acquire the answer information corresponding to the question information by inputting the spliced text segments, the layout information and the image information into a pre-established reading comprehension model; the reading comprehension model is trained by the any method for training a model in the embodiments of the disclosure.

In an alternative implementation, the reading comprehension model includes a segment encoder, a document encoder, an image encoder and a CRF module; the generation module 704 is configured to: input spliced text segments, the layout information and the image information into the reading comprehension model; acquire a text encoding of each of the spliced text segments by encoding each of the spliced text segments and the layout information based on the segment encoder; acquire a document encoding of the candidate rich-text document by splicing text encodings of the spliced text segments based on the document encoder; acquire visual features of the candidate rich-text document by encoding the image information based on the image encoder; and acquire a multi-modal fusion encoding of the candidate rich-text document by fusing the document encoding and the visual features of the candidate rich-text document, and acquire the answer information corresponding to the question information by inputting the multi-modal fusion encoding into the CRF module.

Figure 8:
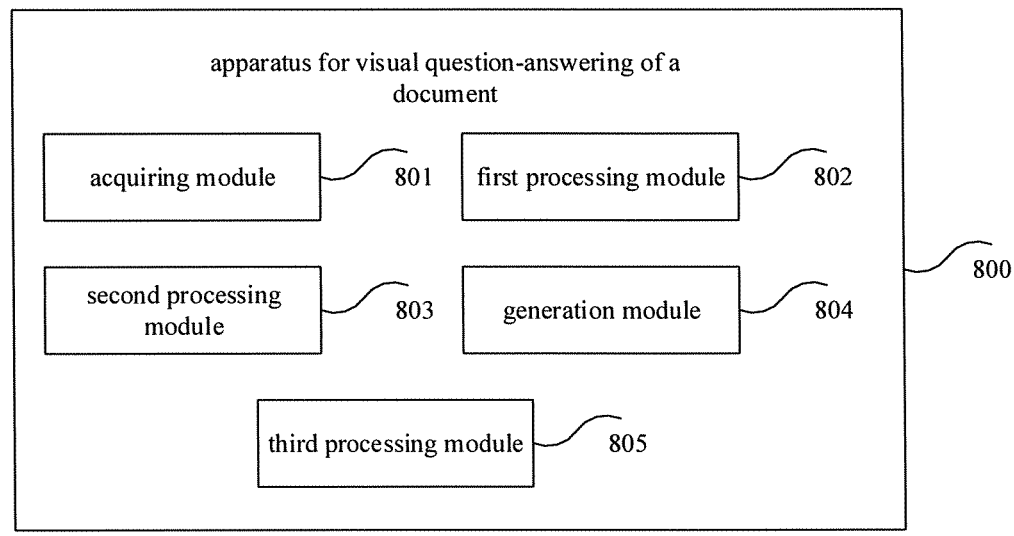
FIG. 8 is a diagram illustrating another apparatus for visual question-answering of a document according to some embodiments of the disclosure.

Optionally, the reading comprehension model further includes a classifier; the apparatus for visual question-answering of a document further includes a third processing module. As an example, as illustrated in FIG. 8, the apparatus further includes a third processing module 805 configured to acquire a spliced encoding by splicing the multi-modal fusion encoding and an encoding of the question sample; and acquire a similarity predicted value between the question information and the candidate rich-text document by inputting the spliced encoding into the classifier. Blocks 801 to 804 in FIG. 8 have the same function and structure with blocks 701 to 704 in FIG. 7.

Figure 9:
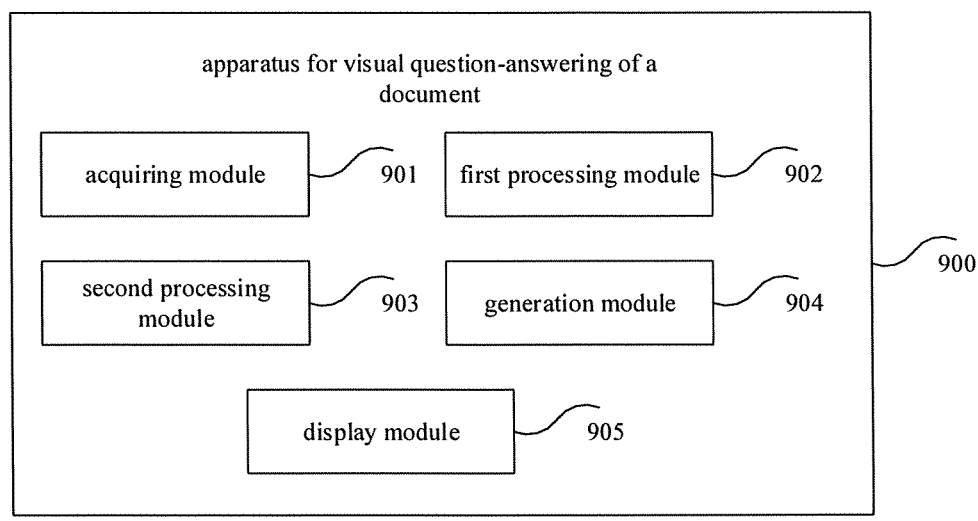
FIG. 9 is a diagram illustrating another apparatus for visual question-answering of a document according to some embodiments of the disclosure.

Optionally, the apparatus for visual question-answering of a document further includes a display module. As an example, as illustrated in FIG. 9, the apparatus further includes a display module 905 configured to output the answer information in response to the similarity predicted value being greater than or equal to a threshold. Blocks 901 to 904 in FIG. 9 have the same function and structure with blocks 701 to 704 in FIG. 7.

Optionally, the display module is configured to: determine coordinate information of each text in the answer information based on the layout information; and highlight the answer information in the candidate rich-text document based on the coordinate information.

Optionally, the generation module 704 is configured to: input the multi-modal fusion encoding into the CRF module; acquire an answer sequence labeling output by the CRF module, in which the answer sequence labeling includes an answer begin labeling, an answer inside labeling, an answer outside labeling, an answer end labeling, and a single-character answer labeling; and extract the answer information corresponding to the question information from the candidate rich-text document based on the answer sequence labeling. Optionally, the answer sequence labeling further includes a non-answer text labeling within an answer segment.

By implementing embodiments of the disclosure, modeling using cross-modal information (text, layout, and vision) may improve the comprehension ability to the document; modeling using the rich-text document sample may enhance the comprehension ability of the reading comprehension model to the rich-text document; in addition, information extraction is replaced using the OCR recognition technology, without necessarily designing respectively specific information extraction solutions for documents from different sources, so that the complete process is more end to end, which saves the labor cost.

With regard to the apparatus in embodiments, the specific way each module performs an operation has been described in detail in embodiments of the method and will not be elaborated herein.

According to embodiments of the disclosure, an electronic device and a readable storage medium are further provided in the embodiment.

Figure 10:
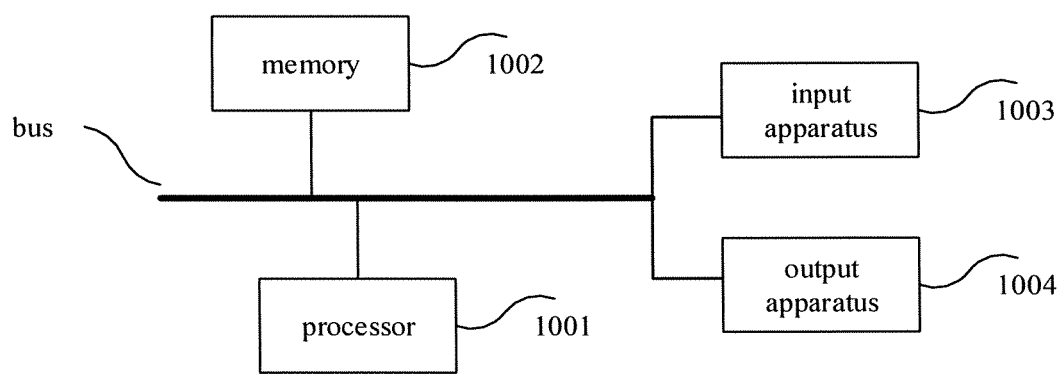
FIG. 10 is a block diagram illustrating an electronic device configured to implement a method for training a document reading comprehension model based on cross-modal information or a method for visual question-answering of a document in some embodiments of the disclosure.

FIG. 10 is a block diagram illustrating an electronic device configured to implement a method for training a document reading comprehension model based on cross-modal information or a method for visual question-answering of a document in some embodiments of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 10, the electronic device includes one or more processors 1001, a memory 1002, and interfaces configured to connect various components including a high-speed interface and a low-speed interface. The various components are connected to each other with different buses, and may be installed on a public main board or installed in other ways as needed. The processor may process instructions executed in the electronic device, including instructions stored in or on the memory to display graphical information of the GUI on an external input/output device (such as a display device coupled to an interface). In other implementation, a plurality of processors and/or a plurality of buses may be configured with a plurality of memories if necessary. Similarly, the processor may connect a plurality of electronic devices, and each device provides a part of necessary operations (for example, as a server array, a group of blade servers, or a multi-processor system). FIG. 10 takes one processor 1001 as an example.

A memory 1002 is a non-transitory computer-readable storage medium provided in the disclosure. The memory is stored with instructions executable by the at least one processor, so that the at least one processor performs the method for training a document reading comprehension model based on cross-modal information or the method for visual question-answering of a document in the embodiment of the disclosure. For the non-transitory computer readable storage medium stored with computer instructions in the disclosure, the computer instructions are configured to cause a computer to perform the method for training a document reading comprehension model based on cross-modal information or the method for visual question-answering of a document in the disclosure.

As a non-transitory computer-readable storage medium, the memory 1002 may be configured to store non-transitory software programs, non-transitory computer-executable programs and modules, such as program instructions/modules corresponding to the method for training a document reading comprehension model based on cross-modal information or the method for visual question-answering of a document in the embodiment of the disclosure (for example, the acquiring module 501, the first processing module 502, the second processing module 503 and the training module 504 as illustrated in FIG. 5, or the third processing module 605 as illustrated in FIG. 6, or the acquiring module 701, the first processing module 702, the second processing module 703 and the generation module 704 as illustrated in FIG. 7, or the third processing module 805 as illustrated in FIG. 8, or the display module 905 as illustrated in FIG. 9). The processor 1001 executes various functional applications and data processing of the server by running a non-transitory software program, an instruction, and a module stored in the memory 1002, that is, implement the method for training a document reading comprehension model based on cross-modal information or the method for visual question-answering of a document in the embodiment of the disclosure.

The memory 1002 may include a program storage area and a data storage area; the program storage area may store operation systems and application programs required by at least one function; the data storage area may store data created by the use of an electronic device based on training of a text reading comprehension model based on cross-modal information or visual question-answering of a document. In addition, the memory 1002 may include a high-speed random access memory, and may further include a non-transitory memory, such as at least one magnetic disk storage device, a flash memory device, or other non-transitory solid-state storage devices. In some embodiments, the memory 1002 optionally includes a memory set remotely relative to the processor 1001 that may be connected to an electronic device based on training of a text reading comprehension model based on cross-modal information or visual question-answering of a document via a network. Examples of the network include, but are not limited to an Internet, an intranet, a local area network, a mobile communication network, and combinations thereof.

The electronic device configured to implement the method for training a document reading comprehension model based on cross-modal information or the method for visual question-answering of a document further may include an input apparatus 1003 and an output apparatus 1004. The processor 1001, the memory 1002, the input apparatus 1003, and the output apparatus 1004 may be connected through a bus or in other ways. FIG. 10 takes connection through a bus as an example.

The input apparatus 1003 may receive input digital or character information, and generate key signal input related to user setting and function control of an electronic device configured to implement the method for training a document reading comprehension model based on cross-modal information or the method for visual question-answering of a document, such as a touch screen, a keypad, a mouse, a track pad, a touch pad, an indicating rod, one or more mouse buttons, a trackball, a joystick and other input apparatuses. The output apparatus 1004 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, softwares, software applications, or codes) include machine instructions of a programmable processor, and may be implemented with high-level procedure and/or object-oriented programming languages, and/or assembly/machine languages. As used herein, the terms "a machine readable medium" and "a computer readable medium" refer to any computer program product, device, and/or apparatus configured to provide machine instructions and/or data for a programmable processor (for example, a magnetic disk, an optical disk, a memory, a programmable logic device (PLD)), including a machine readable medium that receive machine instructions as machine readable signals. The term "a machine readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

According to the technical solution in the embodiment of the disclosure, the comprehension ability of a reading comprehension model to a long rich-text document is improved, and a specific information extraction solution for documents from different sources is not necessarily designed, which saves the labor cost.

It should be understood that, various forms of procedures shown above may be configured to reorder, add or delete blocks. For example, blocks described in the disclosure may be executed in parallel, sequentially, or in a different order, as long as the desired result of the technical solution disclosed in the disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the disclosure shall be included within the protection scope of embodiments of the disclosure.

The invention claimed is:

1. A method for training, based on cross-modal information, a document reading comprehension model, comprising:
   acquiring a question sample and a rich-text document sample, wherein the rich-text document sample comprises a real answer of the question sample;
   acquiring text information and layout information of the rich-text document sample by performing optical character recognition (OCR) processing on image information of the rich-text document sample;
   acquiring a predicted answer of the question sample by inputting the text information, the layout information and the image information of the rich-text document sample into a preset reading comprehension model; and
   training the reading comprehension model based on the real answer and the predicted answer;
   wherein the rich-text document sample is a long rich-text document sample;
   wherein acquiring the predicted answer of the question sample by inputting the text information, the layout information and the image information of the rich-text document sample into the preset reading comprehension model, comprises:
   acquiring text segments by segmenting the text information of the long rich-text document sample based on a preset step length, and acquiring spliced text segments by splicing the question sample with the text segments respectively; and
   acquiring the predicted answer of the question sample by inputting the spliced text segments, the layout information and the image information into the preset reading comprehension model;
   wherein the reading comprehension model comprises a segment encoder, a document encoder, an image encoder and a conditional random field (CRF) module; and
   wherein acquiring the predicted answer of the question sample by inputting the spliced text segments, the layout information and the image information into the preset reading comprehension model, comprises:
   inputting the spliced text segments, the layout information and the image information into the preset reading comprehension model;
   acquiring a text encoding of each of the spliced text segments by encoding each of the spliced text segments and the layout information based on the segment encoder;
   acquiring a document encoding of the long rich-text document sample by splicing text encodings of the spliced text segments based on the document encoder;
   acquiring visual features of the long rich-text document sample by encoding the image information based on the image encoder; and
   acquiring a multi-modal fusion encoding of the long rich-text document sample by fusing the document encoding and the visual features of the long rich-text document sample, and acquiring the predicted answer of the question sample by inputting the multi-modal fusion encoding into the CRF module.

2. The method of claim 1, wherein, the reading comprehension model further comprises a classifier; the method further comprises:
   acquiring a spliced encoding by splicing the multi-modal fusion encoding and an encoding of the question sample; and
   acquiring a similarity predicted value between the question sample and the long rich-text document sample by inputting the spliced encoding into the classifier.

3. The method of claim 2, wherein, training the reading comprehension model based on the real answer and the predicted answer, comprises:
   generating a first loss value based on the real answer and the predicted answer;
   generating a second loss value based on the similarity predicted value and a similarity real value between the question sample and the long rich-text document sample; and
   training the reading comprehension model based on the first loss value and the second loss value.

4. The method of claim 1, wherein acquiring the predicted answer of the question sample by inputting the multi-modal fusion encoding into the CRF module, comprises:
   inputting the multi-modal fusion encoding into the CRF module;
   acquiring an answer sequence labeling output by the CRF module, wherein, the answer sequence labeling comprises an answer begin labeling, an answer inside labeling, an answer outside labeling, an answer end labeling, and a single-character answer labeling; and
   extracting the predicted answer of the question sample from the long rich-text document sample based on the answer sequence labeling.

5. The method of claim 4, wherein, the answer sequence labeling further comprises a non-answer text labeling within an answer segment.

6. A non-transitory computer-readable storage medium stored with computer instructions, wherein, the computer instructions are configured to cause a computer to perform the method of claim 1.

7. A method for visual question-answering of a document, comprising:
- acquiring a candidate rich-text document corresponding to question information in response to receiving the question information;
- acquiring text information and layout information of the candidate rich-text document by performing optical character recognition (OCR) processing on image information of the candidate rich-text document;
- acquiring text segments by segmenting the candidate rich-text document based on a preset step length, and acquiring spliced text segments by splicing the question sample with the text segments respectively; and
- generating answer information corresponding to the question information based on the spliced text segments, the layout information and the image information;
- wherein generating the answer information corresponding to the question information based on the spliced text segments, the layout information and the image information, comprises:
- acquiring the answer information corresponding to the question information by inputting the spliced text segments, the layout information and the image information into a pre-established reading comprehension model;
- wherein, the reading comprehension model comprises a segment encoder, a document encoder, an image encoder and a conditional random field (CRF) module; and
- wherein acquiring the answer information corresponding to the question information by inputting the spliced text segments, the layout information and the image information into the pre-established reading comprehension model, comprises:
- inputting the spliced text segments, the layout information and the image information into the reading comprehension model;
- acquiring a text encoding of each of the spliced text segments by encoding each of the spliced text segments and the layout information based on the segment encoder;
- acquiring a document encoding of the candidate rich-text document by splicing text encodings of the spliced text segments based on the document encoder;
- acquiring visual features of the candidate rich-text document by encoding the image information based on the image encoder; and
- acquiring a multi-modal fusion encoding of the candidate rich-text document by fusing the document encoding and the visual features of the candidate rich-text document, and acquiring the answer information corresponding to the question information by inputting the multi-modal fusion encoding into the CRF module.

8. The method of claim 7, wherein, the reading comprehension model further comprises a classifier; the method further comprises:
- acquiring a spliced encoding by splicing the multi-modal fusion encoding and an encoding of the question sample; and
- acquiring a similarity predicted value between the question information and the candidate rich-text document by inputting the spliced encoding into the classifier.

9. The method of claim 8, further comprising:
- outputting the answer information in response to the similarity predicted value being greater than or equal to a threshold.

10. The method of claim 9, wherein, outputting the answer information, comprises:
- determining coordinate information of each text in the answer information based on the layout information; and
- highlighting the answer information in the candidate rich-text document based on the coordinate information.

11. The method of claim 9, further comprising:
- omitting the answer information in response to the similarity predicted value being less than to the threshold.

12. The method of claim 7, wherein, acquiring the answer information corresponding to the question information by inputting the multi-modal fusion encoding into the CRF module, comprises:
- inputting the multi-modal fusion encoding into the CRF module;
- acquiring an answer sequence labeling output by the CRF module; wherein, the answer sequence labeling comprises an answer begin labeling, an answer inside labeling, an answer outside labeling, an answer end labeling, and a single-character answer labeling; and
- extracting the answer information corresponding to the question information from the candidate rich-text document based on the answer sequence labeling.

13. The method of claim 12, wherein, the answer sequence labeling further comprises a non-answer text labeling within an answer segment.

14. An electronic device, comprising:
- a processor; and
- a memory for storing instructions executable by the processor;
- wherein, the processor is configured to perform the method of claim 7.

15. A non-transitory computer-readable storage medium stored with computer instructions, wherein, the computer instructions are configured to cause a computer to perform the method of claim 7.

16. An electronic device, comprising:
- a processor; and
- a memory for storing instructions executable by the processor;
- wherein, the processor is configured to:
- acquire a question sample and a rich-text document sample, wherein the rich-text document sample comprises a real answer of the question sample;
- acquire text information and layout information of the rich-text document sample by performing optical character recognition (OCR) processing on image information of the rich-text document sample;
- acquire a predicted answer of the question sample by inputting the text information, the layout information and the image information of the rich-text document sample into a preset reading comprehension model; and
- train the reading comprehension model based on the real answer and the predicted answer;
- wherein the rich-text document sample is a long rich-text document sample;
- wherein the processor is further configured to:
- acquire text segments by segmenting the text information of the long rich-text document sample based on a preset step length, and acquiring spliced text segments by splicing the question sample with the text segments respectively; and acquire the predicted answer of the question sample by inputting the spliced text segments, the layout information and the image information into the preset reading comprehension model;

wherein the reading comprehension model comprises a segment encoder, a document encoder, an image encoder and a conditional random field (CRF) module; and wherein the processor is further configured to:

input the spliced text segments, the layout information and the image information into the preset reading comprehension model;

acquire a text encoding of each of the spliced text segments by encoding each of the spliced text segments and the layout information based on the segment encoder;

acquire a document encoding of the long rich-text document sample by splicing text encodings of the spliced text segments based on the document encoder;

acquire visual features of the long rich-text document sample by encoding the image information based on the image encoder; and acquire a multi-modal fusion encoding of the long rich-text document sample by fusing the document encoding and the visual features of the long rich-text document sample, and acquiring the predicted answer of the question sample by inputting the multi-modal fusion encoding into the CRF module.

* * * * *